US008926725B2

(12) United States Patent
Loken et al.

(10) Patent No.: US 8,926,725 B2
(45) Date of Patent: Jan. 6, 2015

(54) V-SHAPED FILTER WITH SERVICEABLE FRAMES AND CARTRIDGES

(75) Inventors: Gregory K. Loken, Stoughton, WI (US); Mark V. Holzmann, Stoughton, WI (US); Peter K. Herman, Stoughton, WI (US); Scott W. Schwartz, Cottage Grove, WI (US); Travis E. Goodlund, McFarland, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 233 days.

(21) Appl. No.: 13/562,422

(22) Filed: Jul. 31, 2012

(65) Prior Publication Data

US 2014/0034565 A1 Feb. 6, 2014

(51) Int. Cl.
*B01D 50/00* (2006.01)

(52) U.S. Cl.
USPC .......... 55/484; 55/467; 55/521; 210/232; 210/323.1

(58) Field of Classification Search
CPC ....... B01D 46/02; B01D 46/10; B01D 46/125
USPC .......... 55/484, 467, 521; 210/232, 323.1
See application file for complete search history.

(56) References Cited

U.S. PATENT DOCUMENTS

| 2,966,959 | A | * | 1/1961 | Neumann | 55/484 |
| 4,882,055 | A |   | 11/1989 | Stamstad |  |
| 5,776,218 | A | * | 7/1998 | Enns | 55/495 |
| 6,375,700 | B1 |  | 4/2002 | Jaroszczyk et al. |  |
| 6,846,342 | B2 |  | 1/2005 | Mertz et al. |  |
| 6,955,696 | B1 |  | 10/2005 | Ost et al. |  |
| 7,090,711 | B2 |  | 8/2006 | Gillingham et al. |  |
| 7,588,629 | B2 |  | 9/2009 | Osborne et al. |  |
| 7,597,735 | B2 |  | 10/2009 | Terres |  |
| 7,691,165 | B1 |  | 4/2010 | Hammes |  |
| 7,740,678 | B2 |  | 6/2010 | Gunderson et al. |  |
| 7,935,160 | B2 |  | 5/2011 | Holzmann et al. |  |
| 2007/0204579 | A1 |  | 9/2007 | Karlsson et al. |  |
| 2008/0011673 | A1 |  | 1/2008 | Janikowski et al. |  |
| 2009/0193773 | A1 |  | 8/2009 | Sundvik et al. |  |
| 2010/0126128 | A1 |  | 5/2010 | Scott, III |  |
| 2012/0067013 | A1 | * | 3/2012 | Antony et al. | 55/357 |
| 2012/0067323 | A1 |  | 3/2012 | Patwardhan et al. |  |
| 2012/0174788 | A1 |  | 7/2012 | Felber et al. |  |

* cited by examiner

*Primary Examiner* — Jason M Greene
*Assistant Examiner* — Karla Hawkins
(74) *Attorney, Agent, or Firm* — Foley & Lardner LLP

(57) ABSTRACT

A V-shaped filter includes a V-shaped carrier frame, first and second cartridge frames movably mounted to the carrier frame, and first and second filter element cartridges removably and replaceably mounted to the first and second cartridge frames, respectively. The first and second cartridge frames are movable to an inserted position in the V-shaped carrier frame providing an installed condition with the first and second cartridge frames forming a V-shape, and are movable to an extended position extending beyond the V-shaped carrier frame and providing a replacement-service condition.

30 Claims, 9 Drawing Sheets

V-SHAPED FILTER WITH SERVICEABLE FRAMES AND CARTRIDGES

BACKGROUND AND SUMMARY

The invention relates to V-shaped filters.

V-shaped filters are known in the prior art, including a pair of filter media panel elements having respective root ends and diverging therefrom to distal ends in a V-shape.

The present disclosure arose during continuing development efforts in the above technology.

DETAILED DESCRIPTION

Figure 1:
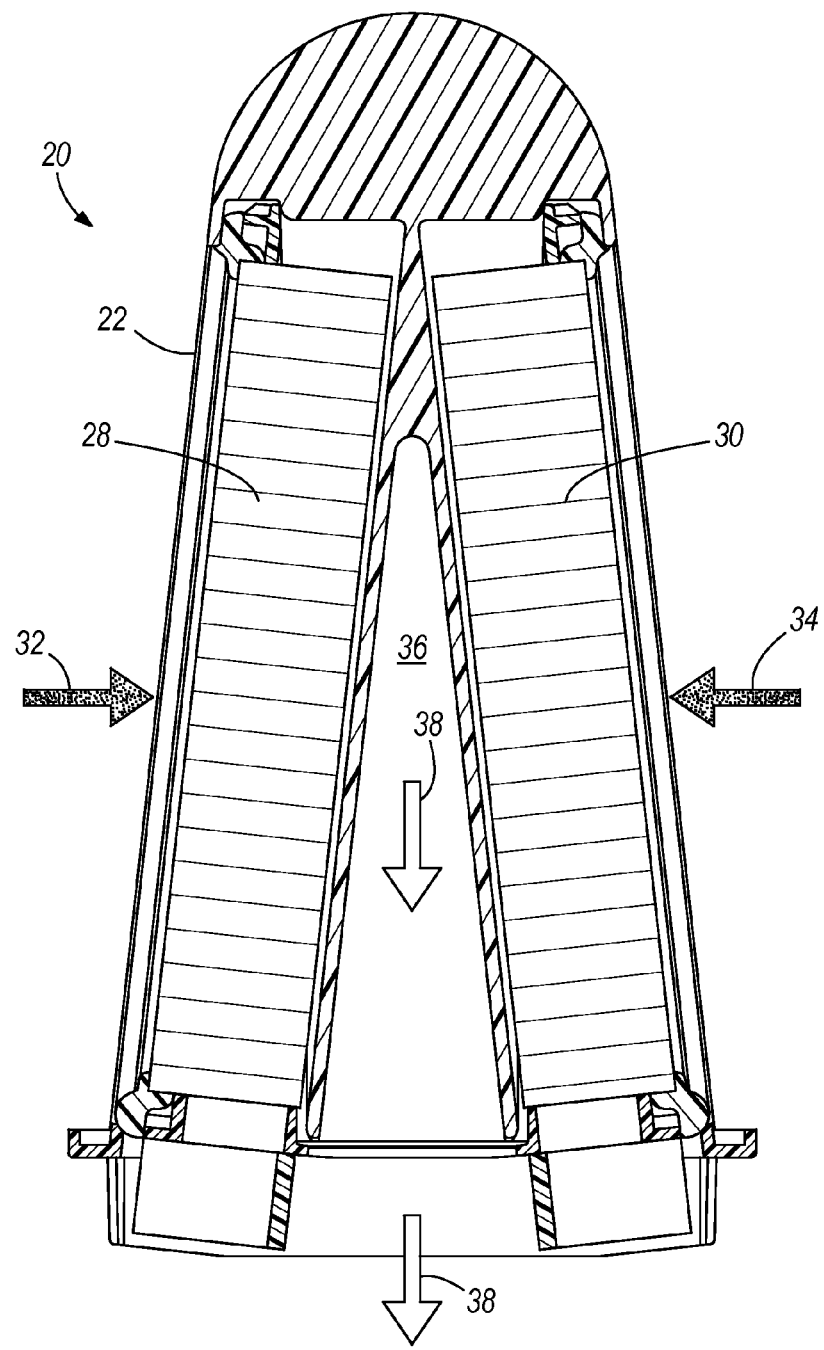
FIG. 1 is an end view of a V-shaped filter.
Figure 2:
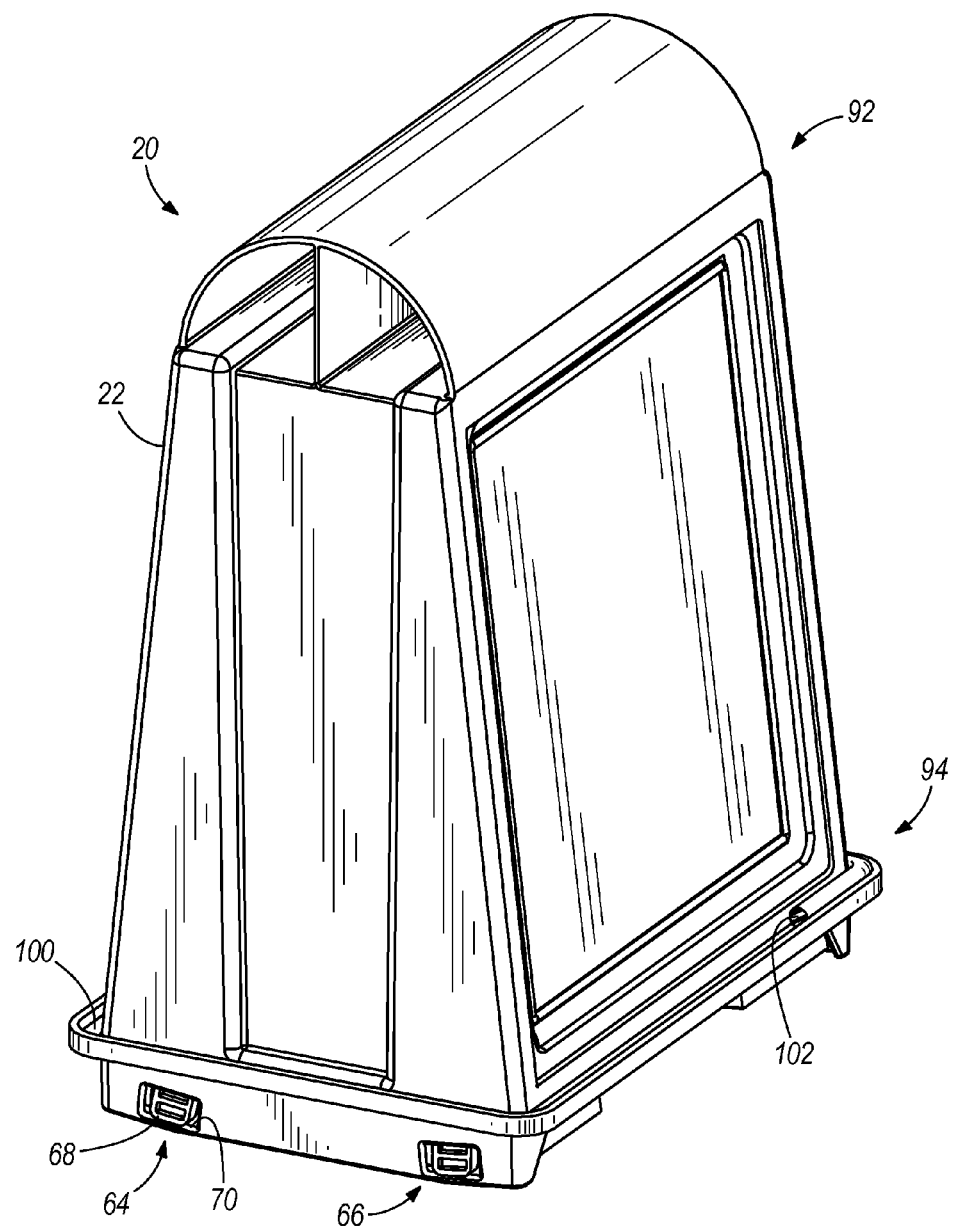
FIG. 2 is a perspective view of the filter of FIG. 1.
Figure 3:
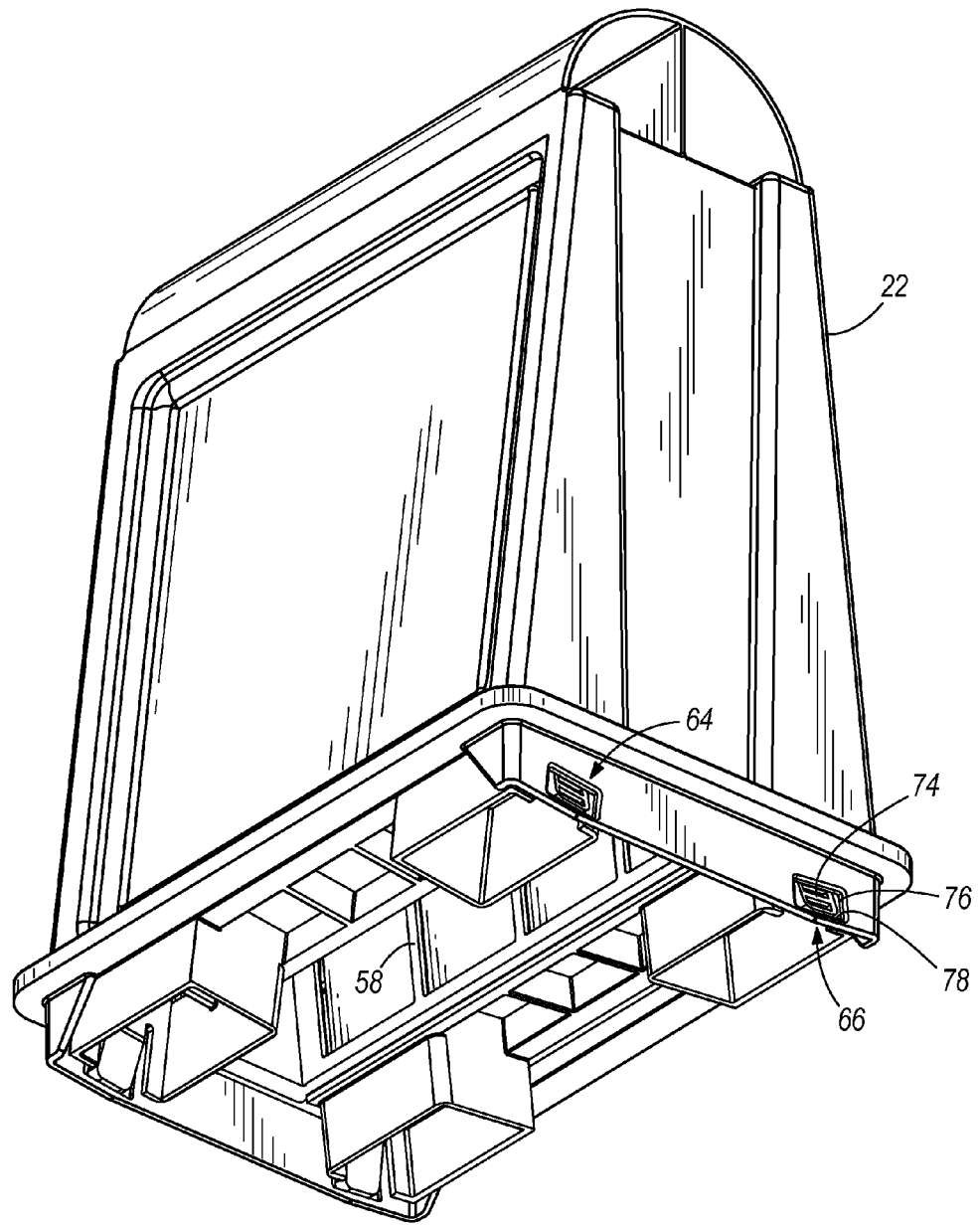
FIG. 3 is another perspective view of the filter of FIG. 1.
Figure 4:
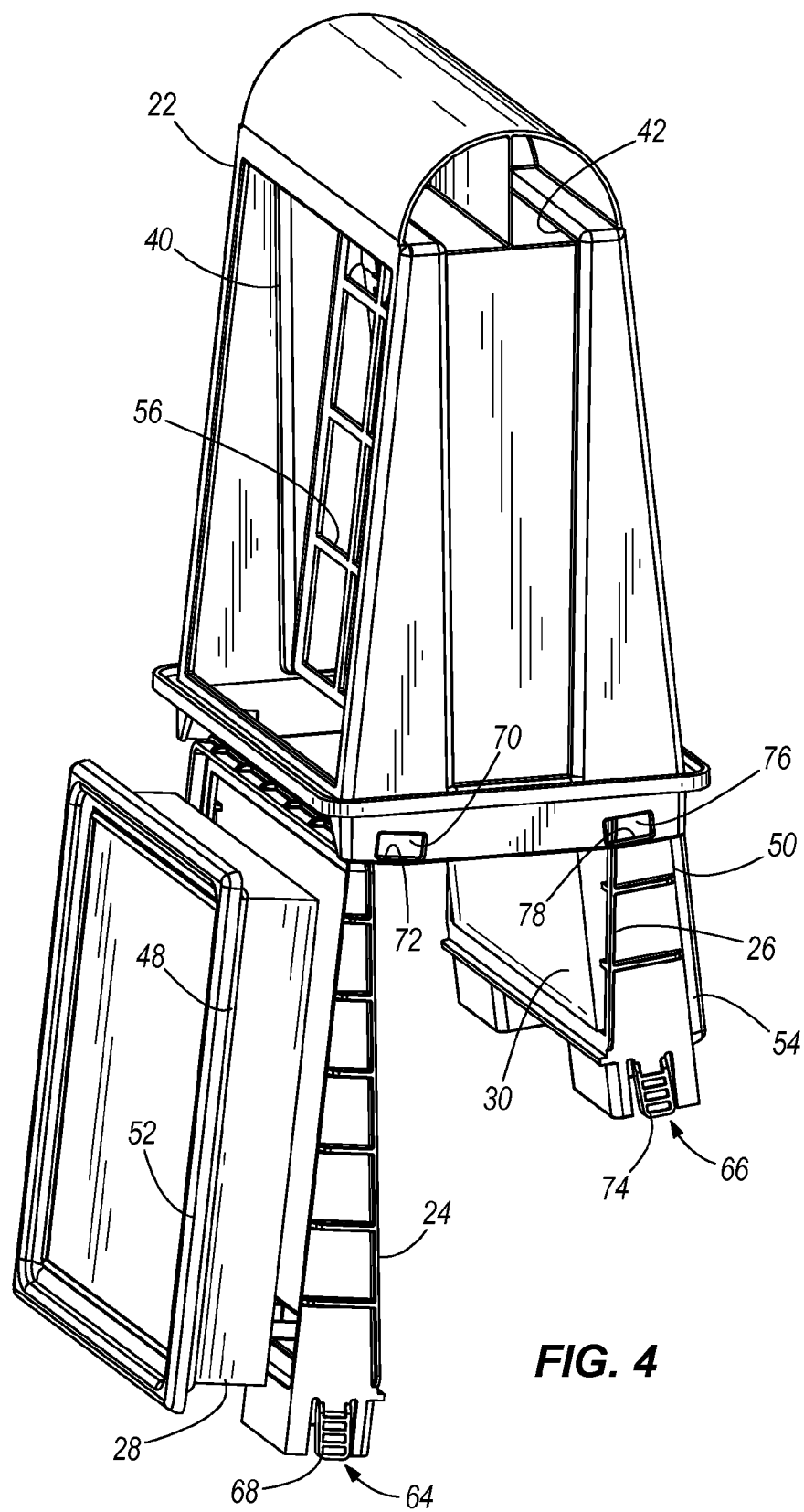
FIG. 4 is an exploded perspective view of the filter of FIG. 1.
Figure 5:
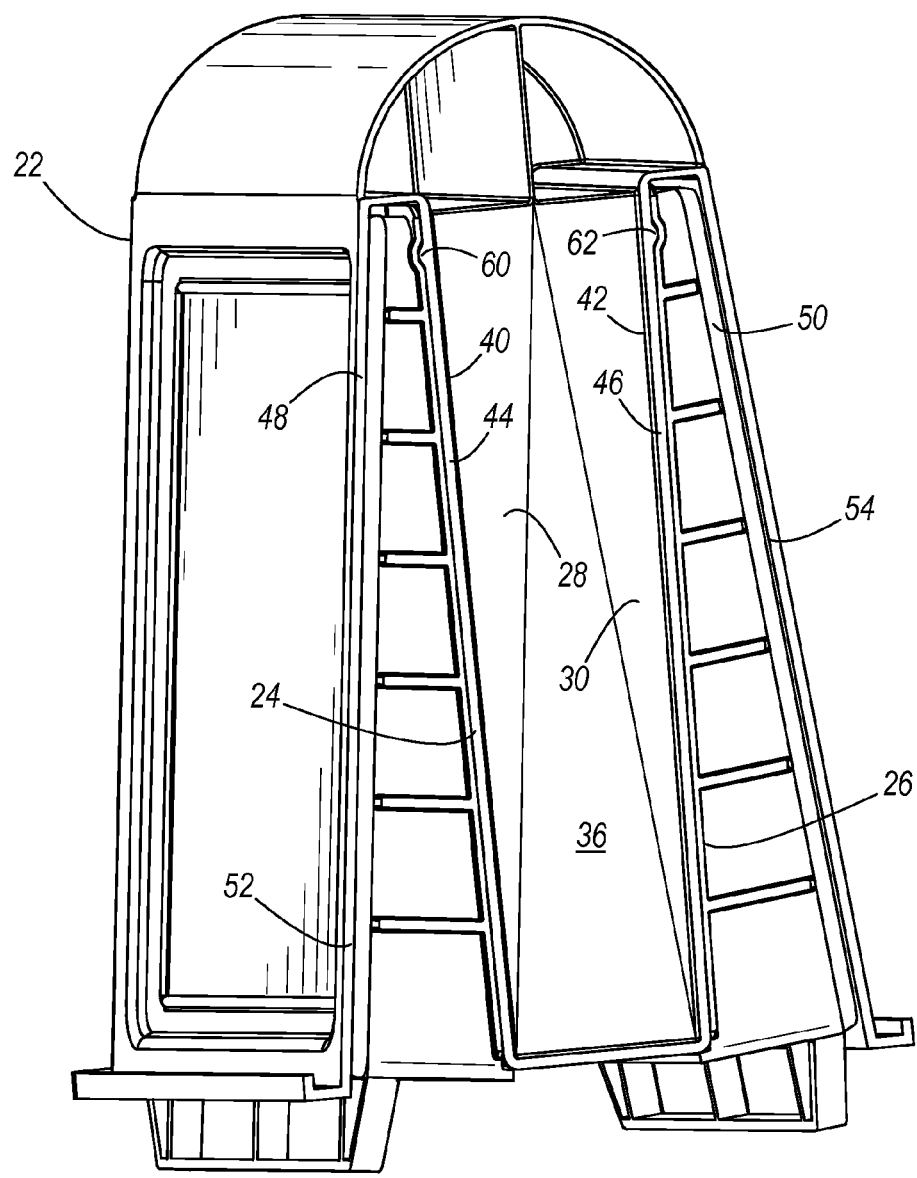
FIG. 5 is a perspective view partially cut away of the filter of FIG. 1.

FIGS. 1-4 show a V-shaped filter 20 including a V-shaped carrier frame 22, first and second cartridge frames 24 and 26, FIG. 4, movably mounted to carrier frame 22 and movable to an inserted position, FIG. 5, in the V-shaped carrier frame providing an installed condition with the first and second cartridge frames 24 and 26 forming a V-shape, FIG. 1, and movable to an extended position, FIG. 4, extending beyond V-shaped carrier frame 22 providing a replacement-service condition. First and second filter element cartridges 28 and 30 are removably and replaceably mounted to first and second cartridge frames 24 and 26, respectively. Filter element cartridges 28 and 30 may be media panel filter elements, as known in the prior art. For further reference regarding V-shaped filters, reference is made to commonly owned co-pending U.S. patent application Ser. No. 13/223,387, filed Sep. 1, 2011, U.S. Patent Application Publication No. US 2012/0067013, and U.S. patent application Ser. No. 13/229,835, filed Sep. 12, 2011, U.S. Patent Application Publication No. US 2012/0067323, all incorporated herein by reference. In one embodiment, the fluid to be filtered may flow outside-in, e.g. inwardly through the filter media panel elements at filter element cartridges 28 and 30 to be filtered thereby as shown at arrows 32 and 34, then discharged as clean filtered fluid into the V-shaped space 36 between filter element cartridges 28 and 30, then discharged as shown at arrow 38 downwardly in the orientation of FIG. 1. In an alternate embodiment, the fluid to be filtered may flow inside-out, e.g. upwardly in the orientation of FIG. 1, oppositely to the direction of arrow 38, into V-shaped space 36, then outwardly through filter element cartridges 28 and 30 to be filtered thereby and then discharged as clean filtered fluid, oppositely to the direction of arrows 32 and 34.

Movement of cartridge frames 24 and 26 to the inserted position traps and seals filter element cartridges 28 and 30 respectively to cartridge frames 24 and 26 in the installed condition. Movement of cartridge frames 24 and 26 from the inserted position to the extended position, FIG. 4, allows removal of filter element cartridges 28 and 30 respectively from cartridge frames 24 and 26 in the noted replacement-service condition, to enable installation of replacement filter element cartridges. V-shaped carrier frame 22 has first and second sets of guide track channels 40 and 42 receiving cartridge frames 24 and 26, respectively, along first and second insertion directions, FIGS. 4, 5, and guiding first and second cartridge frames 24 and 26 along the first and second insertion directions to the inserted position, FIG. 5, in the installed condition forming the V-shape. Guide track channels 40 and 42 respectively engage cartridge frames 24 and 26 in compressive sealing relation at first and second sets of sealing interfaces 44 and 46 when cartridge frames 24 and 26 are in the installed condition in the inserted position. Cartridge frames 24 and 26 respectively engage filter element cartridges 28 and 30 in compressive sealing relation at respective sets of sealing interfaces 48 and 50 when cartridge frames 24 and 26 are in the installed condition in the inserted position. In one embodiment, guide track channels 40 and 42 engage cartridge frames 24 and 26 in wedge-shape compressive sealing relation, and cartridge frames 24 and 26 engage filter element cartridges 28 and 30 in wedge-shape compressive sealing relation. In one embodiment, the latter sealing relation is facilitated by respective perimeteral resilient gaskets 52 and 54. In a further embodiment, particularly for outside-in flow, carrier frame 22 may include truss-works or lattices 56 and 58 bordering inner V-shaped space 36 and providing inner support for filter element cartridges 28 and 30 while still allowing flow inwardly therethrough.

First and second cartridge frames 24 and 26 are inserted along the noted first and second insertion directions respectively along first and second travel strokes from a respective beginning of a travel stroke, FIG. 4, to a respective end of a travel stroke, FIG. 5. First cartridge frame 24 and first set of guide track channels 40 have a first set of mating detents 60 tactilely engaging each other at the end of the noted first travel stroke and retaining first cartridge frame 24 in the inserted position in the installed condition. Second cartridge frame 26 and second set of guide track channels 42 have a second set of mating detents 62 tactilely engaging each other at the end of the noted second travel stroke and retaining second filter cartridge 26 in the inserted position in the installed condition. The detent may be provided by a hump or bump on one of the members, e.g. guide track channel 40, and a concavity or recess in the other member, e.g. cartridge frame 24, which bump and recess engage in tactile frictional relation and which may be overcome to enable the cartridge frame to be moved to its extended position, FIG. 4.

In a further embodiment, first cartridge frame 24 and V-shaped carrier frame 22 engage each other in locking relation at the end of the noted first travel stroke at a first releasable mechanical lock 64, FIGS. 2-4, 6, 7, locking cartridge frame 24 in the inserted position in the installed condition until mechanically released. Second cartridge frame 26 and V-shaped carrier frame 22 engage each other in locking relation at the end of the noted second travel stroke at a second releasable mechanical lock 66 locking second cartridge frame 26 in inserted position in the installed condition until mechanically released. In one embodiment, first releasable mechanical lock 64 includes a first movable locking finger 68 on one of the first cartridge frame 24 and V-shaped carrier frame 22, e.g. on cartridge frame 24, and a first slot 70 with a first stop surface 72 on the other of the first cartridge frame 24 and the V-shaped carrier frame 22, e.g. on carrier frame 22. First releasable mechanical lock 64 has a locked condition with first movable locking finger 68 extending into first slot 70 and engaging first stop surface 72 in mechanically stopped relation to prevent withdrawal of first cartridge frame 24 along first set of guide track channels 40 from the inserted position in the installed condition. First releasable mechanical lock 64 has a released condition with first movable locking finger 68 withdrawn from first slot 70, e.g. by the operator pushing finger 68 inwardly, and disengaging first stop surface 72 to permit withdrawal of first cartridge frame 24 along first set of guide track channels 40. Second releasable mechanical lock 66 includes a second movable locking finger 74 on one of second cartridge frame 26 and V-shaped carrier frame 22, e.g. on cartridge frame 26, and a second slot 76 with a second stop surface 78 on the other of the second cartridge frame 26 and the V-shaped carrier frame 22, e.g. on V-shaped carrier frame 22. Second releasable mechanical lock 66 has a locked condition with second movable locking finger 74 extending into second slot 76 and engaging second stop surface 78 in mechanically stopped relation to prevent withdrawal of second cartridge frame 26 along second set of guide track channels 42 from the inserted position in the installed condition. Second releasable mechanical lock 66 has a released condition with second movable locking finger 74 withdrawn from second slot 76, e.g. by the operator pushing finger 74 inwardly, and disengaging second stop surface 78 to permit withdrawal of second cartridge frame 26 along the second set of guide channels 42.

Figure 8:
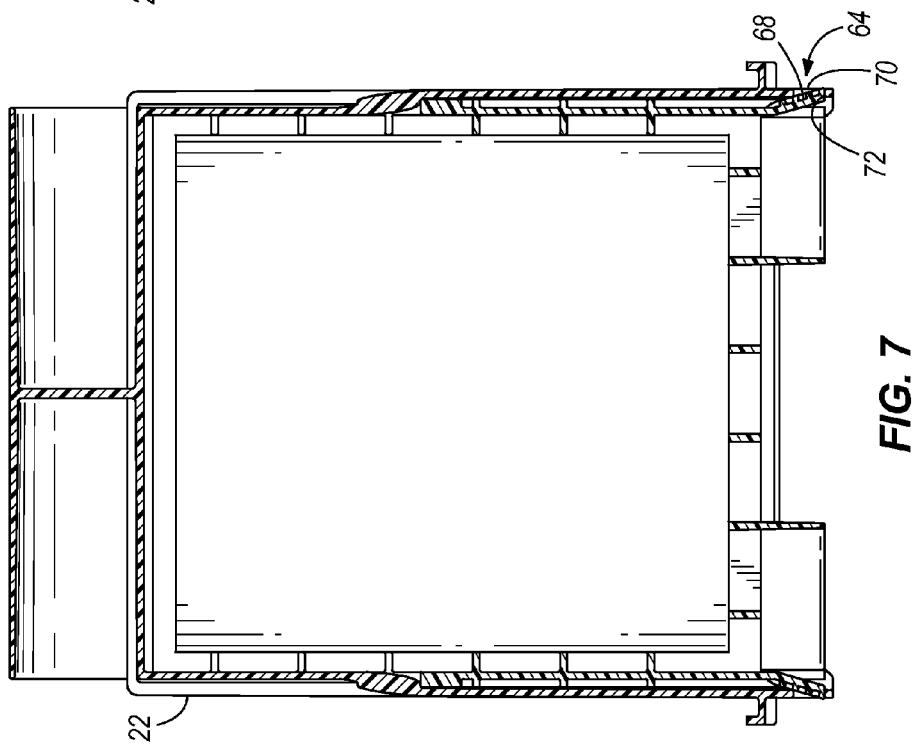
FIG. 8 is like FIG. 7 and shows another embodiment.
Figure 9:
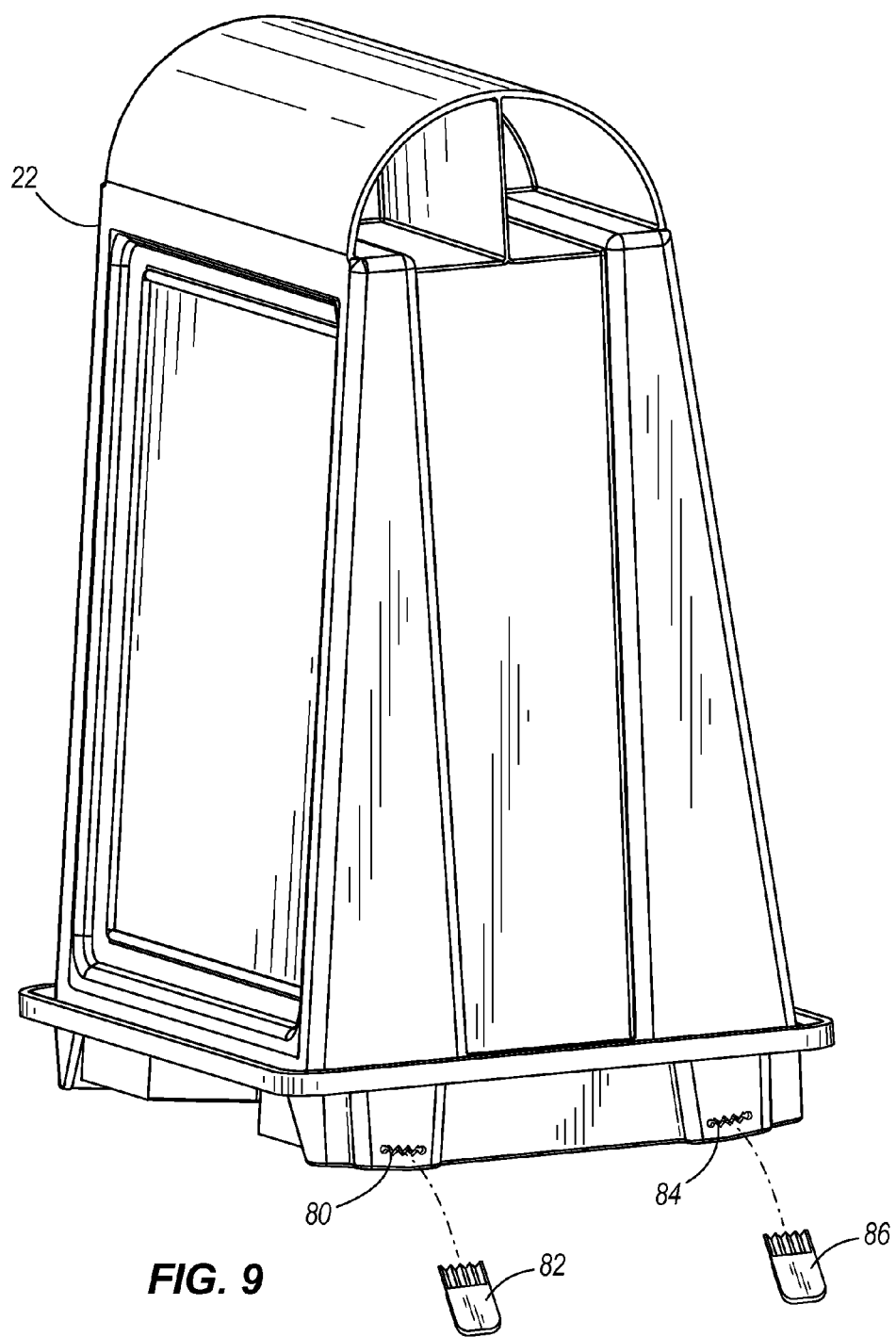
FIG. 9 is like FIG. 2 and shows another embodiment.

In a further embodiment, first slot 70 may include an outer first configured keyhole 80, FIGS. 8, 9, having a designated shape selected to match and receive a first security key 82 of complemental shape for insertion into first configured keyhole 80 to engage and move first movable locking finger 68 out of first slot 70. Second slot 76 may have a second configured keyhole 84 having a second designated shape selected to match and receive a second security key 86 of complemental shape for insertion into second configured keyhole 84 to engage and move second movable locking finger 74 out of second slot 76. In one embodiment, the noted first and second designated shapes are the same, and first and second security keys 82 and 86 are interchangeable and replaceable by a single key. In a further embodiment, first movable locking finger 68 is a first deflection release button engaging first slot 70 in snap-fit relation, and second movable locking finger 74 is a second deflection release button engaging second slot 76 in snap-fit relation.

Figure 6:
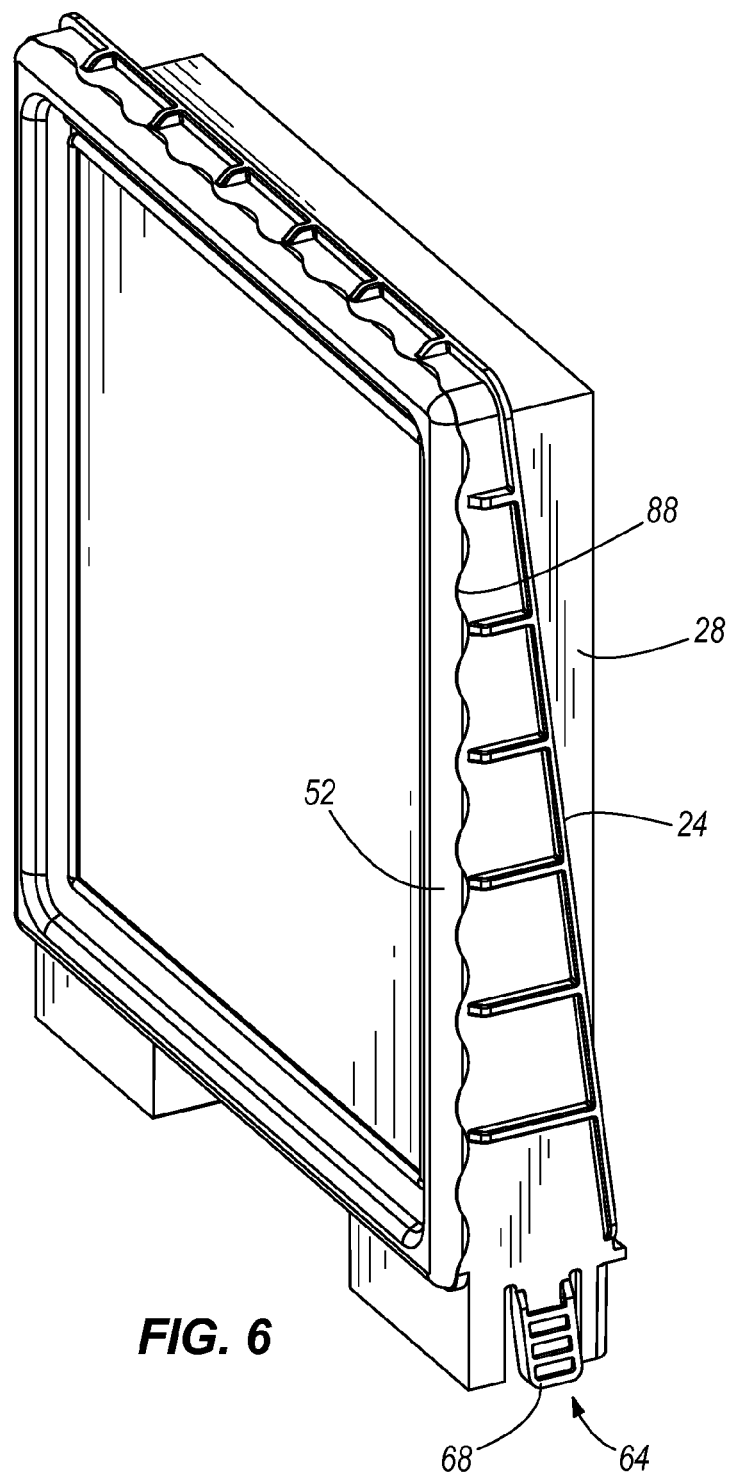
FIG. 6 is a perspective view of a component of FIG. 5.
Figure 7:
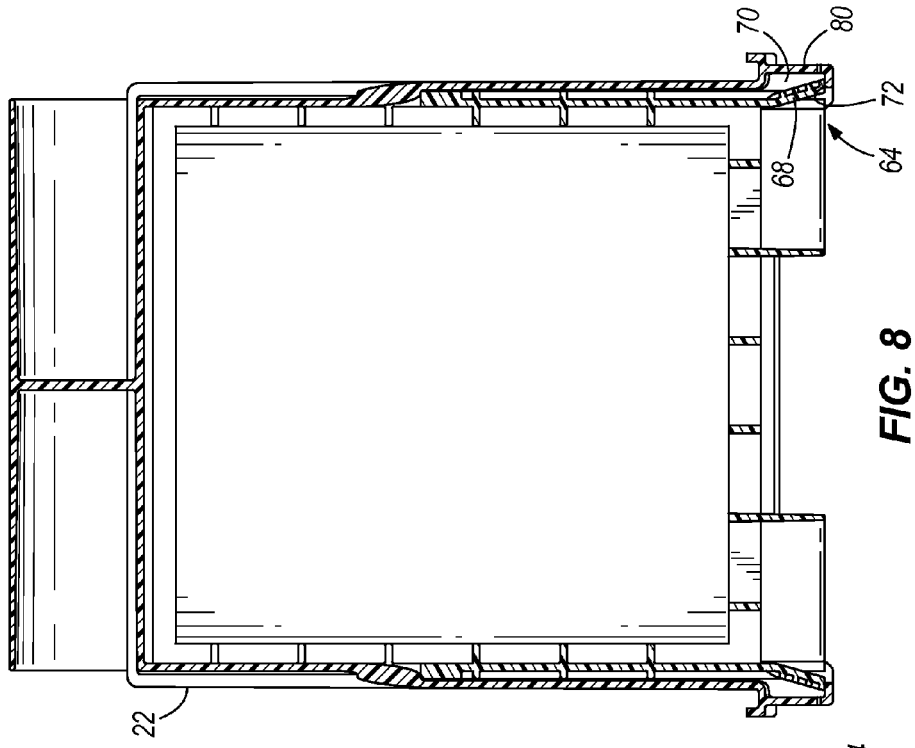
FIG. 7 is a side view partially cut away of the filter of FIG. 1.

In a further embodiment, first cartridge frame 24 and first filter element cartridge 28 have configured mating surfaces 88, FIG. 6, e.g. a wave shape, or other shapes, uniquely locating first filter element cartridge 28 in fixed position on first cartridge frame 24, which configured mating surfaces may likewise be provided for the second filter element cartridge and second cartridge frame. In one embodiment, the noted configured mating surfaces of the first and second filter element cartridges are identical, and the first and second filter element cartridges are interchangeable.

In one embodiment, first filter element cartridge 28 has a first perimeteral gasket 52 compressively engaging V-shaped carrier frame 22 in both axially and laterally compressed sealing relation, wherein the axial compression of first perimeteral gasket 52 is along the noted direction of insertion of first cartridge frame 24 to the inserted position in the installed condition, and wherein the lateral compression of first perimeteral gasket 52 is along a direction transverse to the noted insertion direction of first cartridge frame 24. Second filter element cartridge 30 has a second perimeteral gasket 54 engaging V-shaped carrier frame 22 in both axially and laterally compressed sealing relation, wherein the axial compression of second perimeteral gasket 54 is along the noted direction of insertion of second cartridge frame 26 to the inserted position in the installed condition, and wherein the lateral compression of the second perimeteral gasket 54 is along a direction transverse to the direction of insertion of second cartridge frame 26 to the inserted position in the installed condition.

Figure 10:
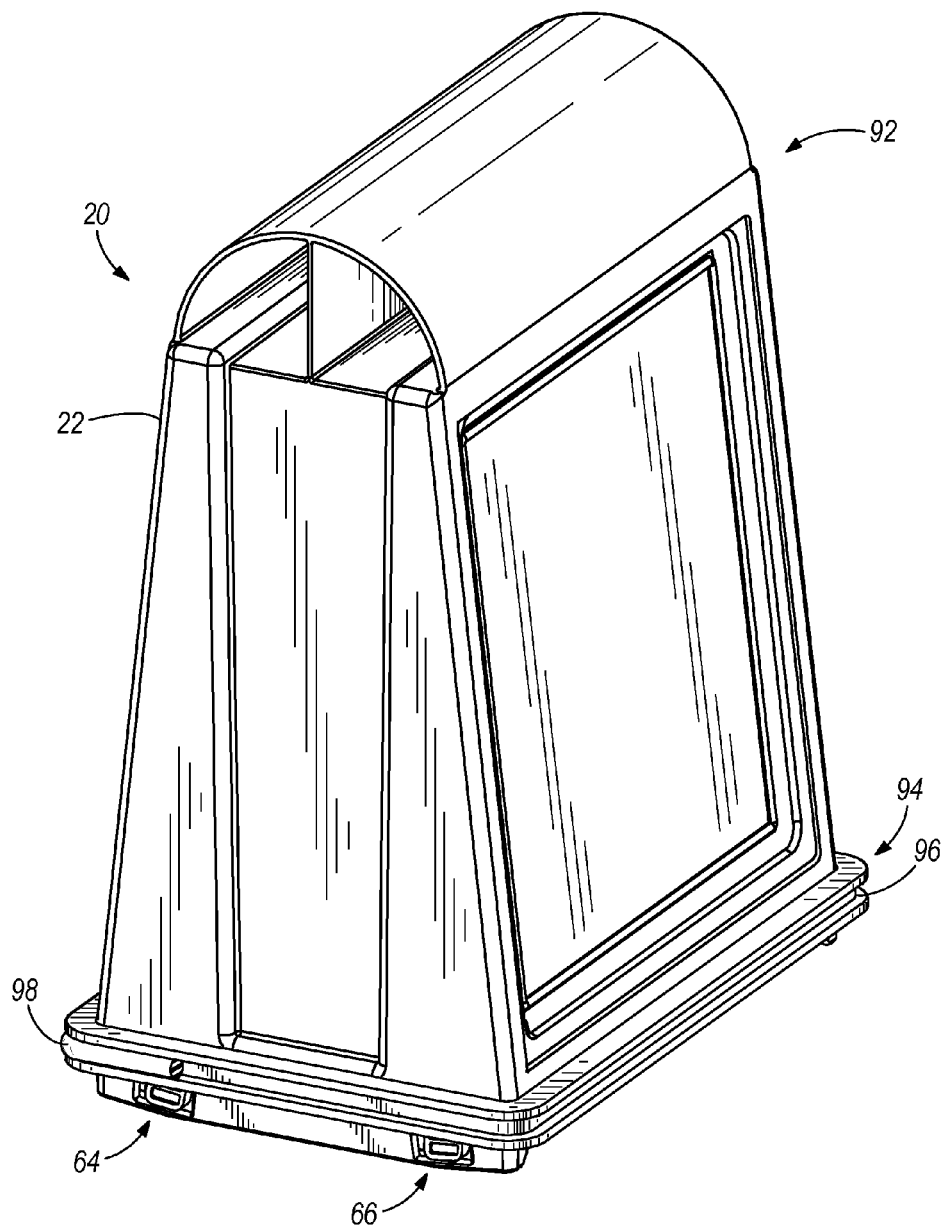
FIG. 10 is like FIG. 2 and shows another embodiment.

V-shaped carrier frame 22 has a root end 92, FIG. 10, at the apex of the V-shape, and a distal end 94 distally opposite root end 92. In the embodiment of FIG. 10, a perimeteral groove 96 extends along an extension direction around the perimeter of distal end 94 for receiving a perimeteral gasket, a portion of which is shown at 98, in groove 96 for radial compression sealing of gasket 98 along a radial direction transverse to the noted extension direction, for sealing in a housing, for example housing 122 or 130 in commonly owned co-pending U.S. patent application Ser. No. 13/223,387, filed Sep. 1, 2011, U.S. Patent Application Publication No. US 2012/0067013, or housing 44 in commonly owned co-pending U.S. patent application Ser. No. 13/229,835, filed Sep. 12, 2011, U.S. Patent Application Publication No. US 2012/0067323, all incorporated herein by reference. In another embodiment, FIG. 2, V-shaped carrier frame 22 has a perimeteral groove 100 extending along an extension direction around the perimeter of distal end 94 and facing along an insertion direction (upwardly in FIG. 2) toward root end 92 for receiving a perimeteral gasket, a portion of which is shown at 102, in groove 100 for axial compression sealing of gasket 102 along the noted insertion direction transverse to the noted extension direction, for sealing in a housing, for example as noted above.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A V-shaped filter comprising:
a V-shaped carrier frame;
first and second cartridge frames movably mounted to the carrier frame, and movable to an inserted position in the V-shaped carrier frame providing an installed condition with the first and second cartridge frames forming a V-shape, and movable to an extended position extending beyond the V-shaped carrier frame providing a replacement-service condition;
first and second filter element cartridges removably and replaceably mounted to the first and second cartridge frames, respectively;
wherein a first locking element of the first cartridge frame and a second locking element of the second cartridge frame each extend into respective mating elements of the V-shaped carrier frame when the first and second cartridge frames are in the inserted position, thereby preventing withdrawal of the first cartridge frame and the second cartridge frame from the V-shaped carrier.

2. The V-shaped filter according to claim 1 wherein movement of the first and second cartridge frames to the inserted position traps and seals the first and second filter element cartridges respectively to the first and second cartridge frames in the installed condition, and movement of the first and second cartridge frames from the inserted position to the extended position allows removal of the first and second filter element cartridges respectively from the first and second cartridge frames in the replacement-service condition, to enable installation of replacement filter element cartridges.

3. The V-shaped filter assembly according to claim 2 wherein the V-shaped carrier frame has first and second sets of guide track channels receiving the first and second cartridge frames, respectively, along first and second insertion directions, and guiding the first and second cartridge frames along the first and second insertion directions to the inserted position in the installed condition forming the V-shape.

4. The V-shaped filter according to claim 3 wherein the first and second guide track channels respectively engage the first and second cartridge frames in compressive sealing relation at respective first and second sets of sealing interfaces when the first and second cartridge frames are in the installed condition in the inserted position.

5. The V-shaped filter according to claim 3 wherein the first and second cartridge frames respectively engage the first and second filter element cartridges in compressive sealing relation at respective first and second sets of sealing interfaces when the first and second cartridge frames are in the installed condition in the inserted position.

6. The V-shaped filter according to claim 3 wherein the first and second guide track channels respectively engage the first and second cartridge frames in compressive sealing relation at respective first and second sets of sealing interfaces, and the first and second cartridge frames respectively engage the first and second filter element cartridges in compressive sealing relation at respective third and fourth sets of sealing interfaces, when the first and second cartridge frames are in the installed condition in the inserted position.

7. The V-shaped filter according to claim 4 wherein the first and second guide track channels engage the first and second cartridge frames in wedge-shape compressive sealing relation.

8. The V-shaped filter according to claim 5 wherein the first and second cartridge frames engage the first and second filter element cartridges in wedge-shape compressive sealing relation.

9. The V-shaped filter according to claim 6 wherein the first and second guide track channels engage the first and second cartridge frames in wedge-shape compressive sealing relation, and the first and second cartridge frames engage the first and second filter element cartridges in wedge-shape compressive sealing relation.

10. The V-shaped filter according to claim 1 wherein the V-shaped carrier frame has a root end at the apex of the V-shape, and a distal end distally opposite the root end, and a perimeteral groove extending along an extension direction around the perimeter of the distal end for receiving a perimeteral gasket in the groove for radial compression sealing of the gasket along a radial direction transverse to the extension direction.

11. The V-shaped filter according to claim 1 wherein the V-shaped carrier frame has a root end at the apex of the V-shape, and a distal end distally opposite the root end, and a perimeteral groove extending along an extension direction around the perimeter of the distal end and facing along an insertion direction toward the root end for receiving a perimeteral gasket in the groove for axial compression sealing of the gasket along the insertion direction transverse to the extension direction.

12. A V-shaped filter comprising:
a V-shaped carrier frame;
first and second cartridge frames movably mounted to the carrier frame, and movable to an inserted position in the V-shaped carrier frame providing an installed condition with the first and second cartridge frames forming a V-shape such that movement of the first and second cartridge frames to the inserted position traps and seals the first and second filter element cartridges respectively to the first and second cartridge frames in the installed condition, and movable to an extended position extending beyond the V-shaped carrier frame providing a replacement-service condition such that movement of the first and second cartridge frames from the inserted position to the extended position allows removal of the first and second filter element cartridges respectively from the first and second cartridge frames in the replacement-service condition, thereby enabling installation of replacement filter element cartridges;
first and second filter element cartridges removably and replaceably mounted to the first and second cartridge frames, respectively;
wherein the V-shaped carrier frame has first and second sets of guide track channels receiving the first and second cartridge frames, respectively, along first and second insertion directions, and guiding the first and second cartridge frames along the first and second insertion directions to the inserted position in the installed condition forming the V-shape; and
wherein the first and second cartridge frames are inserted along the first and second insertion directions, respectively along first and second travel strokes from a respective beginning of a travel stroke to a respective end of a travel stroke, wherein the first cartridge frame and the first set of guide track channels have a first set of mating detents tactilely engaging each other at the end of the first travel stroke and retaining the first cartridge frame in the inserted position in the installed condition, and the second cartridge frame and the second set of guide track channels have a second set of mating detents tactilely engaging each other at the end of the second travel stroke and retaining the second cartridge frame in the inserted position in the installed condition.

13. The V-shaped filter according to claim 12 wherein the V-shaped carrier frame has a root end at the apex of the V-shape, and a distal end distally opposite the root end, and a perimeteral groove extending along an extension direction around the perimeter of the distal end for receiving a perimeteral gasket in the groove for radial compression sealing of the gasket along a radial direction transverse to the extension direction.

14. The V-shaped filter according to claim 12 wherein the V-shaped carrier frame has a root end at the apex of the V-shape, and a distal end distally opposite the root end, and a perimeteral groove extending along an extension direction around the perimeter of the distal end and facing along an insertion direction toward the root end for receiving a perimeteral gasket in the groove for axial compression sealing of the gasket along the insertion direction transverse to the extension direction.

15. A V-shaped filter comprising:
a V-shaped carrier frame;
first and second cartridge frames movably mounted to the carrier frame, the first and second cartridge frames movable to an inserted position in the V-shaped carrier frame, providing an installed condition with the first and second cartridge frames forming a V-shape such that movement of the first and second cartridge frames to the inserted position traps and seals the first and second filter element cartridges respectively to the first and second cartridge frames in the installed condition, the first and second cartridge frames movable to an extended position extending beyond the V-shaped carrier frame, providing a replacement-service condition such that movement of the first and second cartridge frames from the inserted position to the extended position allows removal of the first and second filter element cartridges respectively from the first and second cartridge frames in the replacement-service condition, thereby enabling installation of replacement filter element cartridges; and first and second filter element cartridges removably and replaceably mounted to the first and second cartridge frames, respectively, wherein the V-shaped carrier frame has first and second sets of guide track channels receiving the first and second cartridge frames, respectively, along first and second insertion directions, and guiding the first and second cartridge frames along the first and second insertion directions to the inserted position in the installed condition forming the V-shape; and wherein the first and second cartridge frames are inserted along the first and second insertion directions, respectively, along first and second travel strokes from a respective beginning of a travel stroke to a respective end of a travel stroke, wherein the first cartridge frame and the V-shaped carrier frame engage each other in locking relation at the end of the first travel stroke at a first releasable mechanical lock locking the first cartridge frame in the inserted position in the installed condition until mechanically released, the first releasable mechanical lock including a first movable locking finger on one of the first cartridge frame and the V-shaped carrier frame and a first slot with a first stop on the other of the first cartridge frame and the V-shaped carrier frame, and wherein the second cartridge frame and the V-shaped carrier frame engage each other in locking relation at the end of the second travel stroke at a second releasable mechanical lock locking the second cartridge frame in the inserted position in the installed condition until mechanically released, the second releasable mechanical lock including a second movable locking finger on one of the second cartridge frame and the V-shaped carrier frame and a second slot with a second stop on the other of the second cartridge frame and the V-shaped carrier frame.

16. The V-shaped filter according to claim 15 wherein the V-shaped carrier frame has a root end at the apex of the V-shape, and a distal end distally opposite the root end, and a perimeteral groove extending along an extension direction around the perimeter of the distal end for receiving a perimeteral gasket in the groove for radial compression sealing of the gasket along a radial direction transverse to the extension direction.

17. The V-shaped filter according to claim 15 wherein the V-shaped carrier frame has a root end at the apex of the V-shape, and a distal end distally opposite the root end, and a perimeteral groove extending along an extension direction around the perimeter of the distal end and facing along an insertion direction toward the root end for receiving a perimeteral gasket in the groove for axial compression sealing of the gasket along the insertion direction transverse to the extension direction.

18. The V-shaped filter according to claim 15 wherein the first releasable mechanical lock having a locked condition with the first movable locking finger extending into the first slot and engaging the first stop surface in mechanically stopped relation to prevent withdrawal of the first cartridge frame along the first set of guide track channels from the inserted position in the installed condition, the first releasable mechanical lock having a released condition with the first movable locking finger withdrawn from the first slot and disengaging the first stop surface to permit withdrawal of the first cartridge frame along the first set of guide track channels, and the second releasable mechanical lock having a locked condition with the second movable locking finger extending into the second slot and engaging the second stop surface in mechanically stopped relation to prevent withdrawal of the second cartridge frame along the second set of guide track channels from the inserted position in the installed condition, the second releasable mechanical lock having a released condition with the second movable locking finger withdrawn from the second slot and disengaging the second stop surface to permit withdrawal of the second cartridge frame along the second set of guide track channels.

19. The V-shaped filter according to claim 18 wherein the first slot comprises a first configured keyhole having a first designated shape selected to match and receive a first security key of complemental shape for insertion into the first configured keyhole to engage and move the first movable locking finger out of the first slot, and wherein the second slot comprises a second configured keyhole having a second designated shape selected to match and receive a second security key of complemental shape for insertion into the second configured keyhole to engage and move the second movable locking finger out of the second slot.

20. The V-shaped filter according to claim 19 wherein the first and second designated shapes are the same, and the first and second security keys are interchangeable and replaceable by a single key.

21. The V-shaped filter according to claim 18 wherein the first movable locking finger comprises a first deflection release button engaging the first slot in snap-fit relation, and the second movable locking finger comprises a second deflection release button engaging the second slot in snap-fit relation.

22. A V-shaped filter comprising:
a V-shaped carrier frame;
first and second cartridge frames movably mounted to the carrier frame, the first and second cartridge frames movable to an inserted position in the V-shaped carrier frame, providing an installed condition with the first and second cartridge frames forming a V-shape, the first and second cartridge frames movable to an extended position extending beyond the V-shaped carrier frame, providing a replacement-service condition; and
first and second filter element cartridges removably and replaceably mounted to the first and second cartridge frames, respectively,
wherein the first cartridge frame and the first filter element cartridge have configured mating surfaces uniquely locating the first filter element cartridge in fixed position on the first cartridge frame, and the second cartridge frame and the second filter element cartridge have configured mating surfaces uniquely locating the second filter element cartridge in fixed position on the second cartridge frame; and
wherein a first locking element of the first cartridge frame and a second locking element of the second cartridge frame each extend into respective mating elements of the V-shaped carrier frame when the first and second cartridge frames are in the inserted position thereby preventing withdrawal of the first cartridge frame and the second cartridge frame from the V-shaped carrier.

23. The V-shaped filter according to claim 22 wherein movement of the first and second cartridge frames to the inserted position traps and seals the first and second filter element cartridges respectively to the first and second cartridge frames in the installed condition, and movement of the first and second cartridge frames from the inserted position to the extended position allows removal of the first and second filter element cartridges respectively from the first and second cartridge frames in the replacement-service condition, to enable installation of replacement filter element cartridges.

24. The V-shaped filter assembly according to claim 22 wherein the V-shaped carrier frame has first and second sets of guide track channels receiving the first and second cartridge frames, respectively, along first and second insertion directions, and guiding the first and second cartridge frames along the first and second insertion directions to the inserted position in the installed condition forming the V-shape.

25. The V-shaped filter according to claim 22 wherein the V-shaped carrier frame has a root end at the apex of the V-shape, and a distal end distally opposite the root end, and a perimeteral groove extending along an extension direction around the perimeter of the distal end for receiving a perimeteral gasket in the groove for radial compression sealing of the gasket along a radial direction transverse to the extension direction.

26. The V-shaped filter according to claim 22 wherein the V-shaped carrier frame has a root end at the apex of the V-shape, and a distal end distally opposite the root end, and a perimeteral groove extending along an extension direction around the perimeter of the distal end and facing along an insertion direction toward the root end for receiving a perimeteral gasket in the groove for axial compression sealing of the gasket along the insertion direction transverse to the extension direction.

27. A V-shaped filter comprising:
a V-shaped carrier frame;
first and second cartridge frames movably mounted to the carrier frame, and movable to an inserted position in the V-shaped carrier frame providing an installed condition with the first and second cartridge frames forming a V-shape, and movable to an extended position extending beyond the V-shaped carrier frame providing a replacement-service condition;
a first filter element cartridge removably and replaceably mounted to the first cartridge frame, respectively;
a second filter element cartridge removably and replaceably mounted to the second cartridge frame;
a first perimeteral gasket coupled to the first filter element cartridge, the first perimeteral gasket compressively engaging the V-shaped carrier frame in both axially and laterally compressed sealing relation, axial compression of the first perimeteral gasket being along the direction of insertion of the first cartridge frame to the inserted position in the installed condition, lateral compression of the first perimeteral gasket being along a direction transverse to the insertion direction of the first cartridge frame; and
a second perimeteral gasket coupled to the second filter element cartridge, the second perimetral gasket compressively engaging the V-shaped carrier frame in both axially and laterally compressed sealing relation, axial compression of the second perimeteral gasket being along the direction of insertion of the second cartridge frame to the inserted position in the installed condition, lateral compression of the second perimeteral gasket being along a direction transverse to the direction of insertion of the second cartridge frame to the inserted position in the installed condition,
wherein movement of the first and second cartridge frames to the inserted position traps and seals the first and second filter element cartridges respectively to the first and second cartridge frames in the installed condition, and movement of the first and second cartridge frames from the inserted position to the extended position allows removal of the first and second filter element cartridges respectively from the first and second cartridge frames in the replacement-service condition, to enable installation of replacement filter element cartridges; and
wherein a first locking element of the first cartridge frame and a second locking element of the second cartridge frame each extend into respective mating elements of the V-shaped carrier frame when the first and second cartridge frames are in the inserted position thereby preventing withdrawal of the first cartridge frame and the second cartridge frame from the V-shaped carrier.

28. The V-shaped filter according to claim 22 wherein the V-shaped carrier frame has a root end at the apex of the V-shape, and a distal end distally opposite the root end, and a perimeteral groove extending along an extension direction around the perimeter of the distal end for receiving a perimeteral gasket in the groove for radial compression sealing of the gasket along a radial direction transverse to the extension direction.

29. The V-shaped filter according to claim 22 wherein the V-shaped carrier frame has a root end at the apex of the V-shape, and a distal end distally opposite the root end, and a perimeteral groove extending along an extension direction around the perimeter of the distal end and facing along an insertion direction toward the root end for receiving a perimeteral gasket in the groove for axial compression sealing of the gasket along the insertion direction transverse to the extension direction.

30. The V-shaped filter according to claim 22 wherein the configured mating surfaces of the first and second filter element cartridges are identical, and the first and second filter element cartridges are interchangeable.

* * * * *